United States Patent [19]

Tamura et al.

[11] 4,219,066
[45] Aug. 26, 1980

[54] PNEUMATIC TIRE HAVING A SIDEWALL PROTECT RIB PROVIDED WITH AN ARTICULAR PART OR GROOVE

[75] Inventors: Akira Tamura, Higashimurayama; Yasuo Suzuki, Akigawa; Akira Oikawa, Higashimurayama, all of Japan

[73] Assignee: Bridgestone Tire Company Limited, Tokyo, Japan

[21] Appl. No.: 938,147

[22] Filed: Aug. 30, 1978

[30] Foreign Application Priority Data

Sep. 7, 1977 [JP] Japan .................................. 52-106763

[51] Int. Cl.² .............................................. B60C 13/00
[52] U.S. Cl. ........................... 152/353 G; 152/353 C; 152/353 R
[58] Field of Search ........... 152/352 R, 352 A, 353 R, 152/353 C, 353 G, DIG. 4; 156/268

[56] References Cited

U.S. PATENT DOCUMENTS

| | | | |
|---|---|---|---|
| 2,268,344 | 12/1941 | Shesterkin | 152/DIG. 4 |
| 2,735,426 | 2/1956 | Claydon | 156/268 X |
| 3,237,672 | 3/1966 | McMannis | 152/352 |
| 3,814,161 | 6/1974 | Powell et al. | 152/353 R X |
| 3,841,373 | 10/1974 | Gilreath | 152/352 X |
| 4,120,337 | 11/1978 | Soma et al. | 152/352 R X |

FOREIGN PATENT DOCUMENTS

| | | | |
|---|---|---|---|
| 1912598 | 12/1969 | Fed. Rep. of Germany | 152/352 |
| 2131874 | 11/1972 | France | 152/353 R |
| 47-13322 | 4/1972 | Japan . | |
| 49-72805 | 7/1974 | Japan . | |
| 50-53803 | 5/1975 | Japan | 152/353 |
| 1275737 | 5/1972 | United Kingdom | 152/353 R |

*Primary Examiner*—John T. Goolkasian
*Assistant Examiner*—Lois E. Rodgers
*Attorney, Agent, or Firm*—Sughrue, Rothwell, Mion, Zinn and Macpeak

[57] ABSTRACT

A pneumatic tire having a protect rib at its sidewall portion is disclosed. This protect rib includes an articular part for absorbing a tension strain caused on the outer surface of the protect rib when the tire is deformed under loaded condition.

5 Claims, 7 Drawing Figures

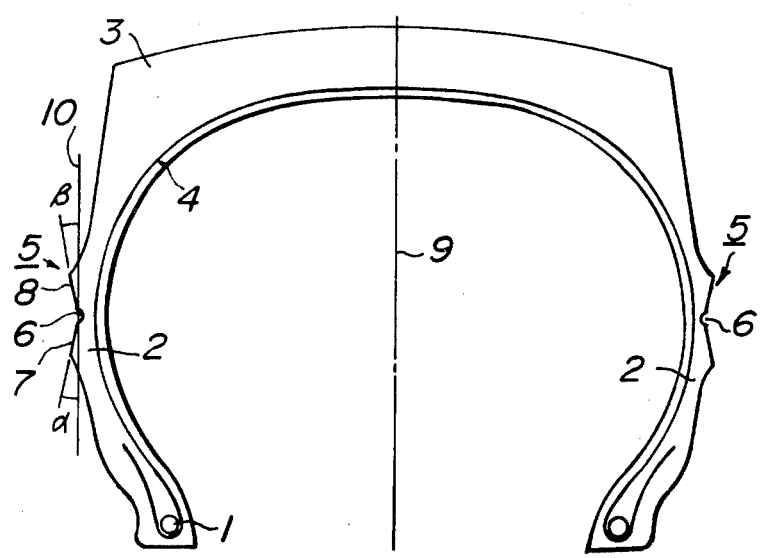
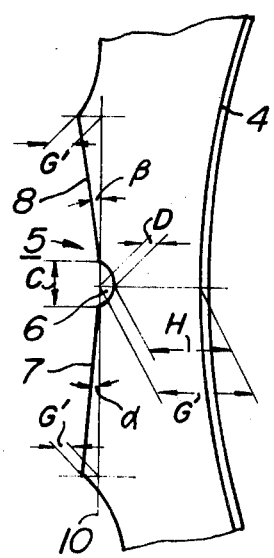
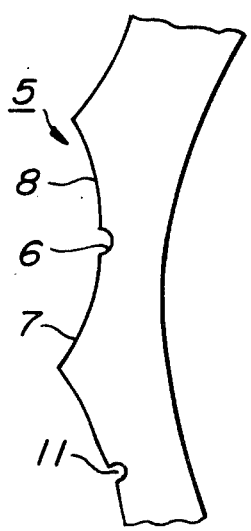
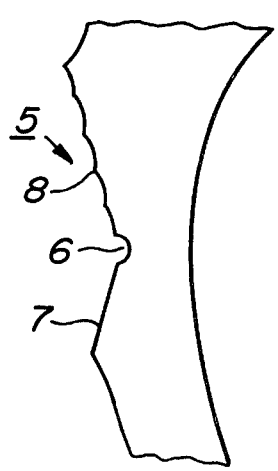

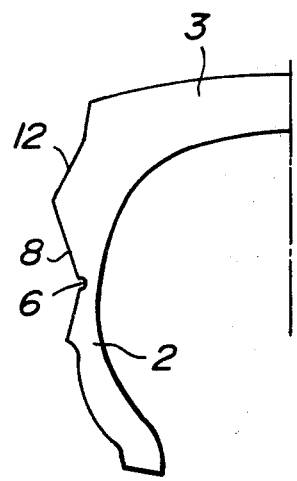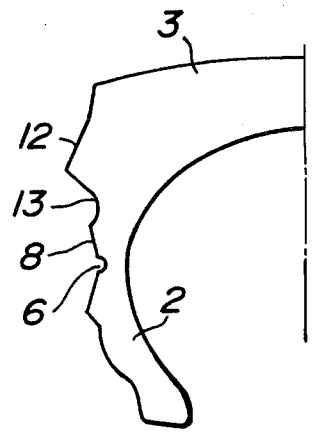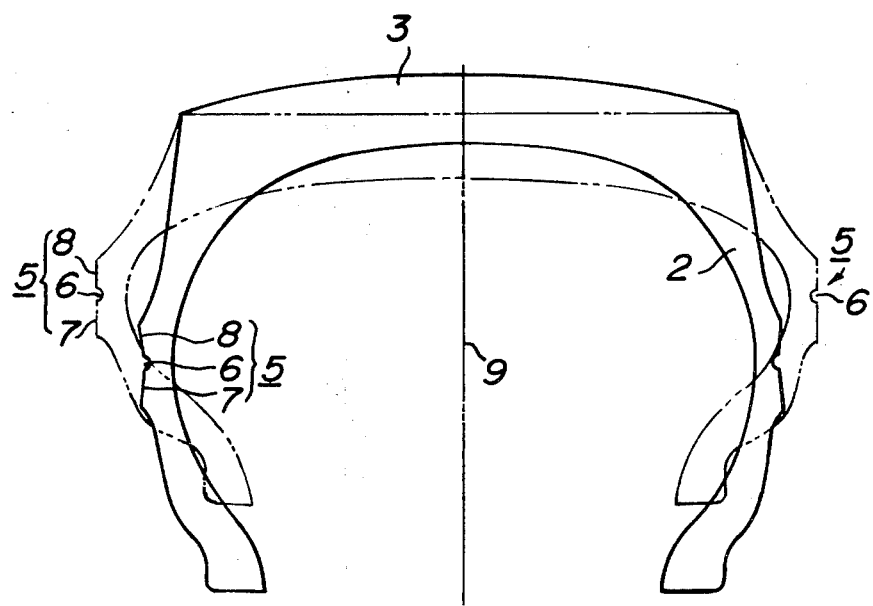

PNEUMATIC TIRE HAVING A SIDEWALL PROTECT RIB PROVIDED WITH AN ARTICULAR PART OR GROOVE

This invention relates to heavy duty pneumatic tires, and more particularly to an improvement of a protect rib for prevention of side-cut in the heavy duty pneumatic tire suitable for off-road vehicles.

In general, the tires of this type are used, for example, in stone pits, construction sites or the like in which the tire runs on a rough road where obstructions such as sharp rocks, broken stones, stubs after felling, pieces of broken metal and the like are scattered thereon under extremely severe service conditions. As a result, these tires frequently make contact with the above obstructions, during which sidewall portions of the tire are subjected to cut failure or a so-called "side-cut".

Hitherto, there have been proposed various means for preventing such side-cut. For instance, the provision of protrusions on a buttress portion of tire as proposed in Japanese Patent Application Publication No. 13,322/72 is effective against cuts caused by rocks flying out from ground contact surface, but is insufficient against the side-cut because the sidewall portion is thinnest in the rubber gauge and is defenseless. Further, the provision of protect ribs on the sidewall portions as proposed in Japanese Patent laid open No. 72,805/74 and Japanese Utility Model laid open No. 53,803/75 apparently anticipates the effect against the side-cut. In this case, however, if the tire is bent due to the deformation under loaded condition, the sidewall portions are expanded transversely and hence the outer surface of the protect rib is in a tension state. As a result, the protect rib is subjected in the tension state to a cut failure. Particularly, rubber is apt to be broken in the tension state, so that the protect rib becomes weak against the cut failure under such a tension state and also the damage due to the cut failure is liable to grow. That is, the cut chance may increase as the protect rib is more projecting with respect to the equatorial line of tire. Therefore, the provision of such protect ribs having an insufficient cut resistance is rather uneconomical.

It is, therefore, an object of the invention to eliminate the above mentioned drawbacks of the prior art and to provide a protect rib capable of effectively developing the performance as a side protector in the deformation of tire under loaded condition.

According to the invention, an articular part is formed in the protect rib so as to absorb strain caused on the outer surface of the protect rib, whereby a large tension strain is not caused on the main outer surface of the protect rib. That is, the invention provides a pneumatic tire comprising a pair of bead cores, a pair of sidewall portions, a tread portion extending between the sidewalls, at least one carcass ply whose ends are wound around the bead cores, respectively, and a protect rib provided on the outer surface of at least one sidewall portion and at the maximum width region of the carcass ply, said tire further comprising an articular part for dividing the protect rib into radially inner and outer portions with respect to the rotational axis of the tire, said articular part being disposed at a position corresponding to a range between 30% and 70% of the tire height perpendicular to the bead base portion of the tire, the vertical distance from the equatorial line to the outer surface of the protective rib being gradually increased from the articular part toward the radially inner and outer portions when the tire is united with a rim and not inflated, and the articular part being not projected out of the outer surface of the protect rib when the tire is inflated and deformed under loaded condition.

The invention will now be described in greater detail with reference to the accompanying drawings, wherein:

FIG. 1 is a cross sectional view of an embodiment of the pneumatic tire according to the invention when the tire is united with a rim (not shown) and not inflated;

FIG. 2 is an enlarged cross sectional view of an embodiment of the protect rib according to the invention;

FIGS. 3 and 4 are partly cross sectional views of other embodiments of the protect rib according to the invention, respectively;

FIGS. 5 and 6 are partly cross sectional views of other embodiments of the pneumatic tire according to the invention, respectively; and FIG. 7 is a cross sectional view of an embodiment of the pneumatic tire according to the invention under loaded condition.

In FIG. 1 is shown an embodiment of the pneumatic tire having a tire size of 20.5 R 25 according to the invention, wherein 1 is a bead core, 2 a sidewall portion, 3 a tread extending between a pair of the sidewall portions, and 4 a carcass ply extending from one bead core 1 to another bead core, whose ends being wound around the bead cores, respectively. FIG. 1 shows the cross section of the pneumatic tire when the tire is united with a normal rim (not shown) and not inflated. According to the invention, a protect rib 5 is disposed at the maximum width region of the carcass ply, i.e. a region where the flexibility is comparatively large, the bulging under loaded condition is large and the rubber gauge becomes relatively thinner, so as to considerably improve a cut resistant property on the sidewall portion of tire. This protect rib 5 includes an articular part 6 as a concave groove formed by cutting from the outer surface of the protect rib toward the inside with respect to the rotational axis of tire. By the provision of the articular part 6, the protect rib 5 is divided into radially inner portion 7 and radially outer portion 8. Further, the articular part 6 serves to absorb a tension strain caused on the outer surface of the protect rib when the tire is inflated and deformed under loaded condition, so that a large tension strain is not caused on the inner portion 7 and outer portion 8.

When the tire is deformed under loaded condition after inflated at a normal pressure, if the outer surface of the protect rib 5 projects on the articular part 6, the protect rib 5 is apt to be subjected to a cut failure at the articular part 6 absorbing the above mentioned strain. Therefore, considering the deformation of the protect rib 5 toward the outside with respect to the rotational axis of tire under loaded condition, it is necessary that a vertical distance from the equatorial line 9 to the outer surface of the protect rib 5 is gradually increased from the articular part 6 toward the radially inner and outer portions when the tire is united with the rim and not inflated.

Numeral 10 represents a line parallel to the equatorial line 9. The outer surface of the radially inner portion 7 is inclined at an angle $\alpha$ of 3° to 30° with respect to the line 10 or the equatorial line 9 and the outer surface of the radially outer portion 8 is inclined at an angle $\beta$ of 5° to 25° with respect to the line 10. Moreover, both of the angles $\alpha$ and $\beta$ are preferably within a range of 8° to 15° in order to enhance the effect of the protect rib. Further, the outer profile of the protect rib 5 at equatorial section is a straight line or an arc described from the outside of tire, but a corrugated pattern may be applied to such an outer profile. In any case, it is necessary that when the tire is deformed under a loaded condition after being inflated at a normal pressure, as shown by the dot-dash line in FIG. 7, the articular part 6 of the protect rib 5 neither projects substantially over the outer surface of the protect rib nor goes into a position corresponding to the maximum width of the tire. Particularly, when the tire is inflated at a normal pressure and deformed under loaded condition, if the outer surface of the protect rib 5 becomes substantially parallel to the equatorial line 9, the resistance against cut failure in any directions is more improved.

The protect rib 5 of FIG. 1 is enlargedly shown in FIG. 2 wherein the angle $\alpha$ is 5° and the angle $\beta$ is 7°. Character G' represents a vertical distance from the line 10 to a top of the protect rib. The maximum value of the vertical distance G' is preferably not more than 2.5% with respect to the maximum width of the outermost carcass ply.

Character D represents a depth of the articular part measured from the outer surface of the protect rib toward the inside with respect to the rotational axis of tire, character C a width of the articular part, and character H a distance from the most deep portion of the articular part to the outermost surface of the carcass ply. In the embodiment of FIGS. 1 and 2, one concave articular part is extended along the circumferential direction of tire, but two or three small concave articular parts may be provided. In any case, the one concave articular part is necessary to have a ratio C/D of the width to the depth of 0.2 to 5.0, preferably 0.8 to 2.0.

Moreover, the depth D of the articular part is about 15% with respect to a gauge G from the outer surface of the protect rib in the articular part to the outermost surface of the carcass ply in the embodiment of FIGS. 1 and 2. However, the depth D is acceptable to be within a range of 7 to 40% with respect to the gauge G.

When the depth D is less than 7%, the effect of absorbing the strain by the articular part hardly appears and also the bottom surface of the articular part becomes close to the outer surface of the protect rib under loaded condition and is rather apt to be damaged due to cut failure. When the depth D exceeds 40%, the aimed effect is still developed, but cracks and other troubles are apt to be caused. The preferred depth D is within a range of 15 to 35% with respect to the gauge G.

In FIGS. 3 and 4 are shown modified embodiments of the protect rib 5 according to the invention, respectively. In the protect rib 5 of FIG. 3, the outer profile is an arc described from the outside of tire and further a groove 11 is provided on the inner portion 7 of the protect rib 5 near its end, which exhibits the substantially same effect as in the articular part according to the invention. In the protect rib 5 of FIG. 4, the outer profile of the radially outer portion 8 shows a corrugated shape in which the vertical distance from the equatorial line is gradually increased from the articular part toward the outer surface of the radially outer portion.

In FIGS. 5 and 6 are shown another embodiments of the tire according to the invention. In the tire of FIG. 5, there is provided the conventional cut protector 12 adjoined with the radially outer portion 8 of the protect rib 5. In the tire of FIG. 6, a separating recess 13 is formed between the cut protector 12 and the radially outer portion 8 of the protect rib 5.

In FIG. 7 is schematically shown a cross section of the tire according to the invention for the comparison of the loaded condition with the no-load condition wherein a solid line represents the tire under no-load condition and a dot-dash line represents the tire under loaded condition. The outer surface of the protect rib 5 is projecting with respect to the equatorial line 9 under no-load condition as shown by the solid line, but the outer surfaces of the radially inner portion 7 and outer portion 8 of the protect rib 5 becomes a straight line and are parallel to the equatorial line 9 under loaded condition as shown by the dot-dash line.

According to the invention, the outer surface of the protect rib provided on the sidewall portion is substantially parallel to the equatorial line when the tire is deformed under loaded condition, so that the tire exhibits a high resistance against cut failure in any directions. Therefore, the invention has a great number of merits in industry.

What is claimed is:

1. In a pneumatic tire comprising a pair of bead cores, a pair of sidewall portions, a tread portion extending between said sidewall portions, at least one carcass ply whose ends are wound around said bead cores, respectively, and a protect rib provided on the outer surface of at least one sidewall portion and at the maximum width region of said carcass ply so as to prevent side-cuts in off-road running, the improvement comprising an articular part for dividing said protect rib into radially inner and outer portions with respect to the rotational axis of tire, said articular part being disposed at a position corresponding to a range between 30% and 70% of the tire height perpendicular to the bead base portion of the tire, the perpendicular distance from the equatorial line to the outer surface of said protect rib being gradually increased from said articular part toward said radially inner and outer portions when said tire is united with a rim and not inflated, and said articular part not being projected out of the outer surface of said protect rib when said tire is deformed under loaded condition after being inflated to a normal pressure.

2. A pneumatic tire as claimed in claim 1, wherein the outer surface of said radially inner portion is inclined at an angle of 3° to 30° with respect to the equatorial line and the outer surface of said radially outer portion is inclined at an angle of 5° to 25° with respect to the equatorial line.

3. A pneumatic tire as claimed in claim 1, wherein the outer surface of said protect rib is substantially parallel to the equatorial line when the tire is deformed under loaded condition.

4. A pneumatic tire as claimed in claim 1, wherein said articular part is a concave groove formed by cutting from the outer surface of said protect rib toward the inside with respect to the rotational axis of tire and the depth of said concave groove is within a range of 7 to 40% of a gauge between the outer surface of said protect rib at that position and said carcass ply.

5. A pneumatic tire as claimed in claim 4, wherein the width of said concave groove is 0.2 to 5.0 times the depth thereof.

* * * * *